United States Patent [19]

Mack et al.

[11] Patent Number: 4,587,950

[45] Date of Patent: May 13, 1986

[54] HEAT PACK APPARATUS

[75] Inventors: William Mack, Commack, N.Y.; Gary G. Matison, Wilton, Conn.

[73] Assignee: Clairol Incorporated, New York, N.Y.

[21] Appl. No.: 687,614

[22] Filed: Dec. 31, 1984

[51] Int. Cl.$^4$ .................................................. F24J 1/00
[52] U.S. Cl. ...................................... 126/263; 44/3 R
[58] Field of Search .............. 126/263, 400, 204, 206; 44/3 A, 3 R; 422/245; 128/403

[56] References Cited

U.S. PATENT DOCUMENTS

| | | | |
|---|---|---|---|
| 1,203,776 | 11/1916 | Paschal | 126/263 |
| 1,384,747 | 7/1921 | Eckelmann et al. | 44/3 R |
| 1,433,010 | 10/1922 | Hogan | 126/263 |
| 1,915,523 | 6/1933 | Ferguson | 126/263 |
| 1,920,853 | 8/1933 | Ferguson | 126/263 |

FOREIGN PATENT DOCUMENTS 66691  6/1981  Japan .................................. 126/263

Primary Examiner—Randall L. Green
Attorney, Agent, or Firm—Gene Warzecha

[57] ABSTRACT

A reusable heat pack containing a solution of a salt hydrate capable of being supercooled to provide heat of crystallization upon inducement of crystallization, the heat pack being provided with a reusable trigger mechanism located on the surface of the heat pack to permit simple and positive initiation of crystallization.

2 Claims, 4 Drawing Figures

HEAT PACK APPARATUS

The present invention relates to improved crystallization initiator devices for reusable heat packs containing supercooled salt hydrate solutions which liberate heat on crystallization.

BACKGROUND OF THE INVENTION

Heat packs as described in the prior art have been long used in various forms in the medical and sports fields. Such heat packs were in the form of hot water bottles or supercooled salt hydrate solutions in flexible containers. Typical of the salt hydrate heat packs are those containing supercooled sodium acetate solutions which become exothermic when crystallization commences.

However, in order to initiate crystallization, the supercooled solution must first be seeded with seed crystal or other solid material capable of inducing crystallization.

The prior art is replete with devices designed to induce crystallization, but all of them have been less than totally acceptable, some being costly to manufacture and others being ineffective.

One way of inducing crystal formation as disclosed in the prior art has been to allow a small amount of supercooled solution to contact the air, permitting evaporation to take place which results in crystal formation. Although means for providing such induction of crystal growth would appear to be simple, the prior art has not disclosed any means for readily utilizing such method.

Other prior art means as disclosed in U.S. Pat. Nos. 549,925, 1,433,010, 1,481,208, 1,812,243, 1,887,613, 2,114,396, 2,220,777, 3,951,127, 4,077,390 and European Patent Application No. 0 045 971 are extremely varied but all require techniques that in the past have proved to be less than totally satisfactory.

U.S. Pat. No. 549,959 discloses a heat retaining device which employs sodium acetate in a vessel jacket. Crystallization is induced by unscrewing a stopper having a rod or needle attached and exposing it to air allowing crystallization to take place on the rod or needle which is then re-inserted into the vessel.

U.S. Pat. No. 1,433,010 discloses a device for storing heat in a shallow, cylindrical vessel containing a supersaturated solution of sodium acetate or another chemical which evolves heat upon crystallization. Crystallization is triggered by removing a screw cap to which is attached a rod inserted in the supersaturated solution. Upon withdrawal of the rod and wiping the rod surface dry, crystallization of sodium acetate residue on the rod is initiated. Upon reinsertion of the rod into the supercooled solution, crystallization is initiated. If crystallization of the solution does not occur, the rod is again withdrawn and seed crystals are introduced.

U.S. Pat. No. 2,220,777 discloses the use of an internal metal trigger which induces crystallization of a sodium acetate solution maintained in a sealed, valveless container.

U.S. Pat. No. 4,077,390 and European Pat. No. WO82/00417 both disclose a sealed heat pack containing an aqueous sodium acetate solution wherein crystallization is induced by the flexing or bending of an internal activator strip.

Other typical prior art devices used to induce crystallization of sodium acetate solutions are referred to in U.S. Pat. No. 4,077,390.

Accordingly, it is an object of the present invention to provide a simple and inexpensive re-usable means of inducing crystallization in supercooled solutions used in heat packs.

DESCRIPTION OF THE PREFERRED EMBODIMENTS

The improvement of the present invention resides in the provision of a novel crystallization inducing device for heat packs of the type containing supercooled salt hydrate solutions such as sodium acetate which eliminates the need for the prior art internal devices heretofore used. More specifically, the improvement resides in the employment of a hermetic seal in the trigger mechanism to avoid premature or autocrystallization.

Figure 1:
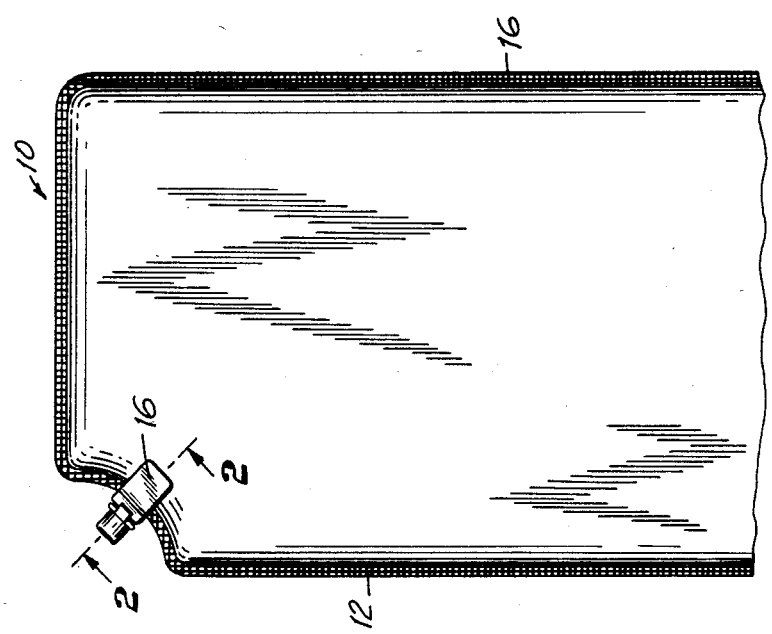
FIG. 1 is a plan view of one embodiment of the invention showing the location of the novel surface mounted crystallization inducing device in relationship to the heat pack.

Referring to FIG. 1, flexible heat pack 10 comprises a flexible container 12 containing a salt hydrate solution 14 which may be constructed of a suitable flexible, water impervious material which is non-reactive with the salt hydrate solution such as polyethylene, polyvinyl chhloride or other like plastic material which can be formed into a suitable package. The package walls 12 may be bonded or heat sealed at their periphery 16.

Figure 2:
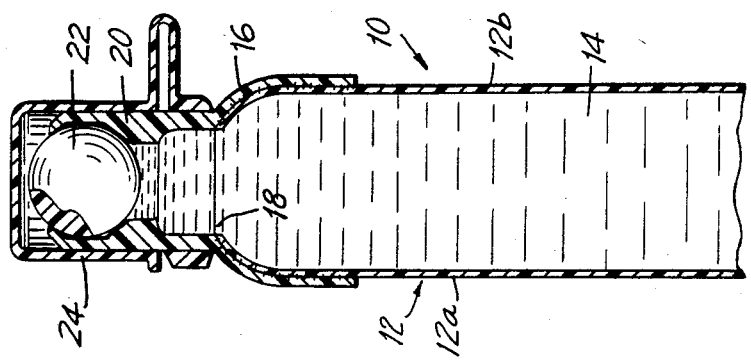
FIG. 2 is a side elevational view of the embodiment of FIG. 1 taken along line 2—2 showing the novel crystallization inducing device for activating the heat pack.

FIG. 2 illustrates the embodiment of FIG. 1 taken along line 2—2 wherein flexible heat pack 10 comprises flexible container 12 having side walls 12a, 12b containing a salt hydrate solution 14 and having a crystallization inducing device 16 mounted in one end thereof. Crystallization inducing device 16 is mounted over opening 18 of heat pack 10 and connected thereto by heat sealing or bonding. Device 16 consists of a rotating ball valve support 20 having positioned therein rotating ball valve 22. Preferably one hemisphere of ball valve 22 has a textured surface and may be optionally covered with an easily removable end cap 24 when not in use.

Figure 3:
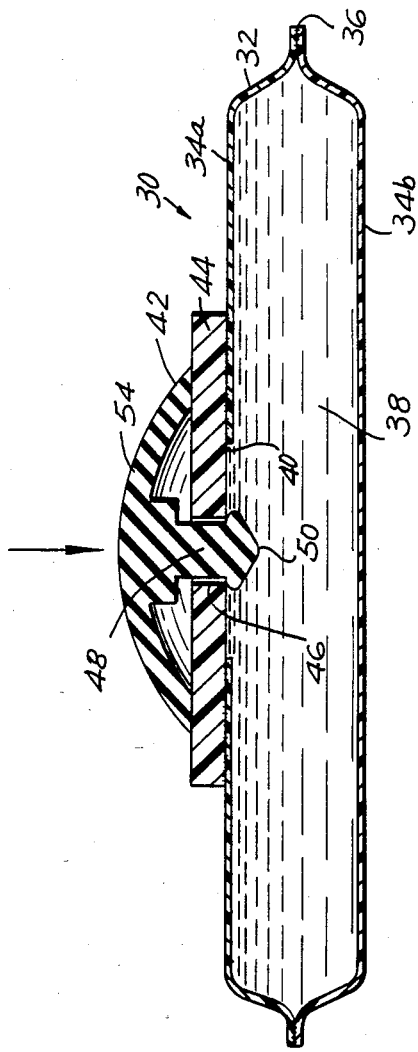
FIG. 3 is a horizontal cross sectional view of another embodiment of the present invention.

FIG. 3 illustrates another embodiment of the crystallization inducing device of the present invention wherein heat pack 30 is comprised of flexible container 32 having side walls 34a and 34b sealed together at their periphery 36 and containing a salt hydrate solution 38. The upper wall 34a has an opening 40 therein of a size sufficiently large to accept the crystallization inducing device 42 of the present invention which is circumjacent to opening 40 and is fastened at base 44 to upper wall 34a by bonding or heat sealing. Crystallization inducing device 42 is comprised of base 44 having a valve orifice 46 therein which permits valve stem 48 located therein and in contact with the walls thereof to axially move therethrough when activated. Valve stem 48 has a lower valve head 50 configured to seat against the lower end of valve orifice 46 in proximate relationship thereto. The opposite end of valve stem 48 is attached to valve shoulder 52 and restricts the movement of valve stem 48. Valve shoulder 52 is an integral part of trigger dome 54 which is fastened to base 44. Trigger dome 54 is constructed of a resilient material which is capable of being compressed and returning to its original configuration when decompresessed. Preferably dome 54 is vented to permit the passage of air therethrough.

Figure 4:
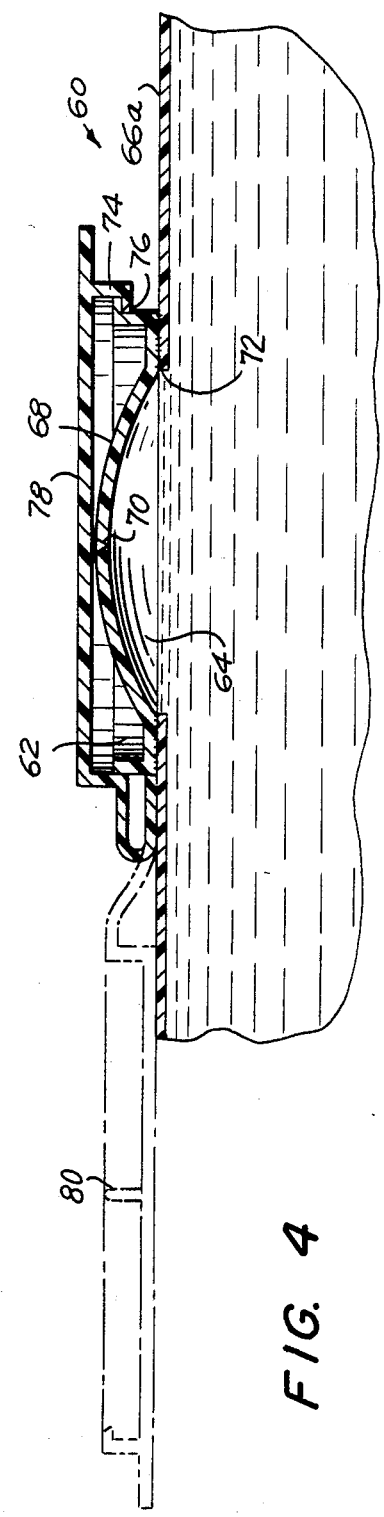
FIG. 4 is a cross sectional view of yet another embodiment of the present invention.

FIG. 4 illustrates yet another embodiment of the present invention wherein the flexible heat pack 60 has crystallization inducing device 62 mounted circumjacent to opening 64 in wall 66a. Crystallization inducing device 62 comprises domed septum 68 having a centrally located self sealing valve orifice 70 and having a perimeter base 72 fastened by heat sealing or bonding to wall 66a, a catch lip 74, a catch 76 configured to engage and hold catch lip 74 which forms a part of protective cap 78 when in the closed and engaged position. Optionally, protective cap 78 may have a penetrating member 80 as shown in FIG. 4 which, when protective cap 78 is in the closed or engaged position, is axially aligned with and located within self-sealing valve orifice 70, the lower end of penetrating member 80 being of sufficient length to pass through self-sealing valve orifice 70 and contact salt hydrate solution within said heat pack 60.

In use, the crystallization inducing device of the present invention will generally be operated so that a small amount of salt hydrate solution is removed from the flexible heat pack and exposed to air. Accordingly, in the embodiment of FIG. 2, crystallization of the salt hydrate is initiated by rotation of the ball valve 22 which wets the ball surface with salt hydrate solution. Upon exposure to air, the salt hydrate solution of the surface of the ball crystallizes. When it is desired to utilize the heat pack, the ball surface having crystallized salt hydrate on its surface is again rotated thereby contacting the salt hydrate solution within the heat pack and initiating crystallization of the entire body of salt hydrate solution with a resultant release of heat. It is preferred that one hemisphere of ball valve 22 has a smooth surface and that the other hemisphere has a textured surface. If desired, each hemisphere surface may be colored differently to permit ready distinction of the two hemispheres. Thus, the smooth surface of rotating ball valve 22 may be maintained in the downward position in contact with salt hydrate solution 14 thereby providing a hermetic seal with the walls of rotating ball valve support 20. When rotating ball valve 22 is rotated more than 180 degrees, the textured surface of rotating ball valve 22 contacts the salt hydrate solution 14 and retains a small amount of salt hydrate solution 14 on its surface and exposes it to air thereby inducing surface crystallization. When rotating ball valve 22 is again rotated so that the textured surface contacts the salt hydrate solution, the textured surface hemisphere, now having crystallized salt hydrate on its surface, contacts salt hydrate solution 14 within heat pack 10 and induces crystallization within the heat pack.

In employing the embodiment of FIG. 3, crystallization of the salt hydrate solution and generation of heat is accomplished by pressing on trigger dome 54 thereby forcing valve stem 48 into salt hydrate solution 38. The depth of penetration is limited by shoulder 30. Penetration of valve stem 48 into salt hydrate solution 38 coats valve stem 48 with salt hydrate solution. Upon release of trigger dome 54, valve stem 48 coated with the salt hydrate solution is withdrawn. Upon contact with air within the chamber formed by trigger dome 54 and base 44, crystallization of the salt hydrate occurs on the surface of valve stem 48. When it is desired to employ the heat pack, trigger dome 54 is pressed thereby forcing valve stem 48 having crystallized salt hydrate on its surface into salt hydrate solution 38, activating crystallization of the salt hydrate within the flexible pack. Preferably, the lower end of valve stem 48 will have a smooth surface capable of providing a tight seal with the walls of orifice 46 and the upper end of valve stem 48 will have a textured surface. Upon compression of trigger dome 54, the upper textured end of valve stem 48 is contacted with the salt hydrate solution 38. Upon release of resilient trigger dome 54, the upper textured end of valve stem 48 is withdrawn from salt hydrate solution 38 leaving a small quantity of such solution on its surface. This salt hydrate solution crystallizes and when trigger dome 54 is again compressed, the crystals on the surface of the upper end of valve stem 48 contact the salt hydrate solution and initiate crystallization.

The valve device of FIG. 4 is operated by raising protective cap 78 and pressing septum 68. Several drops of salt hydrate 14 are pressed out of heat pack 60 and crystallize upon contact with air. The crystallized salt hydrate triggers crystallization of the entire body of salt hydrate solution.

The alternate embodiment of FIG. 4 operates in a like fashion except that penetrating member 80 is inserted into self sealing orifice 70 to coat it with salt hydrate solution. Upon withdrawal, the salt hydrate solution on the surface crystallizes. Reinsertion of penetrating member 80 having crystallized salt hydrate on its surface initiates crystallization of the entire body of salt hydrate solution.

While the present invention has been described by means of the foregoing embodiments, reference should be had to the appended claims for a definition of the scope of the invention.

What is claimed is:

1. In an apparatus suitable for the storage and release of thermal energy in the form of heat of fusion of a salt hydrate comprising a flexible, salt hydrate impervious container, and a solution of salt hydrate and water in the container, the improvement comprising:

a rotatable ball constructed of a material non-reactive with salt hydrates and having a textured surface on one hemisphere thereof and a smooth surface on the other hemisphere thereof;

support means in the surface of said container for rotatably and substantially sealingly supporting said rotatable ball in such a manner that a portion of said rotatable ball is exposed to the interior of said container and a portion thereof is simultaneously exposed to the exterior of said container whereby, upon rotation of said ball, said textured and smooth surfaces may be alternately exposed to the exterior of said container in order to induce crystallization of said solution.

2. In an apparatus suitable for the storage and release of thermal energy in the form of heat of fusion of a salt hydrate comprising a flexible, salt hydrate impervious container, and a solution of salt hydrate and water in the container, the improvement comprising:

a flexible septum area on the surface of said container, said area movable between a depressed and an undepressed state and being provided with at least one self-sealing opening adapted to be closed when the area is in its undepressed state and open toward said solution when the area is in its depressed state, said opening adapted to receive a predetermined amount of solution therein, when said area is in its depressed state, and to expose same to air to form a seed crystal, when said area is in its undepressed state, said seed crystal for inducing crystallization of the salt hydrate in the container upon subsequent depression of said area.

* * * * *